(12) United States Patent
Karlander

(10) Patent No.: US 7,793,996 B2
(45) Date of Patent: Sep. 14, 2010

(54) CRASH BOX AND A METHOD OF FASTENING A BUMPER BEAM

(75) Inventor: Lars Karlander, Skelleftea (SE)

(73) Assignee: Gestamp Hardtech AB, Lulea (SE)

( * ) Notice: Subject to any disclaimer, the term of this patent is extended or adjusted under 35 U.S.C. 154(b) by 398 days.

(21) Appl. No.: 11/991,863

(22) PCT Filed: Sep. 22, 2006

(86) PCT No.: PCT/SE2006/001076
§ 371 (c)(1),
(2), (4) Date: Mar. 12, 2008

(87) PCT Pub. No.: WO2007/035162
PCT Pub. Date: Mar. 29, 2007

(65) Prior Publication Data
US 2010/0148526 A1 Jun. 17, 2010

(51) Int. Cl.
B60R 19/34 (2006.01)

(52) U.S. Cl. .................. 293/133; 296/187.09

(58) Field of Classification Search ............ 296/187.03, 296/187.09, 187.12, 193.08, 193.09; 293/132, 293/133, 154, 155
See application file for complete search history.

(56) References Cited

U.S. PATENT DOCUMENTS

| 6,059,331 | A | 5/2000 | Mori | |
|---|---|---|---|---|
| 6,474,709 | B2 | 11/2002 | Artner | |
| 6,554,176 | B2* | 4/2003 | McGill | 228/169 |
| 6,814,381 | B1 | 11/2004 | Frank | |
| 6,893,078 | B2* | 5/2005 | Saeki | 296/187.09 |

FOREIGN PATENT DOCUMENTS

| DE | 102004060088 | 2/2006 |
|---|---|---|
| EP | 1384536 | 1/2004 |

* cited by examiner

Primary Examiner—Lori L Lyjak
(74) Attorney, Agent, or Firm—Mark P. Stone

(57) ABSTRACT

A bumper beam is fastened to a bumper beam (11) of a vehicle (13) with intermediate crash boxes (12). Each crash box comprises a left member (20) and a right member (21) formed of sheet metal, which are jointed together and have top portions (24,25) overlapping each other and bottom portions (22,23) overlapping each other to form double-sheet tabs (34,35). These tabs extend out over the top and bottom surfaces of the bumper beam and are fastened to these surfaces.

7 Claims, 5 Drawing Sheets

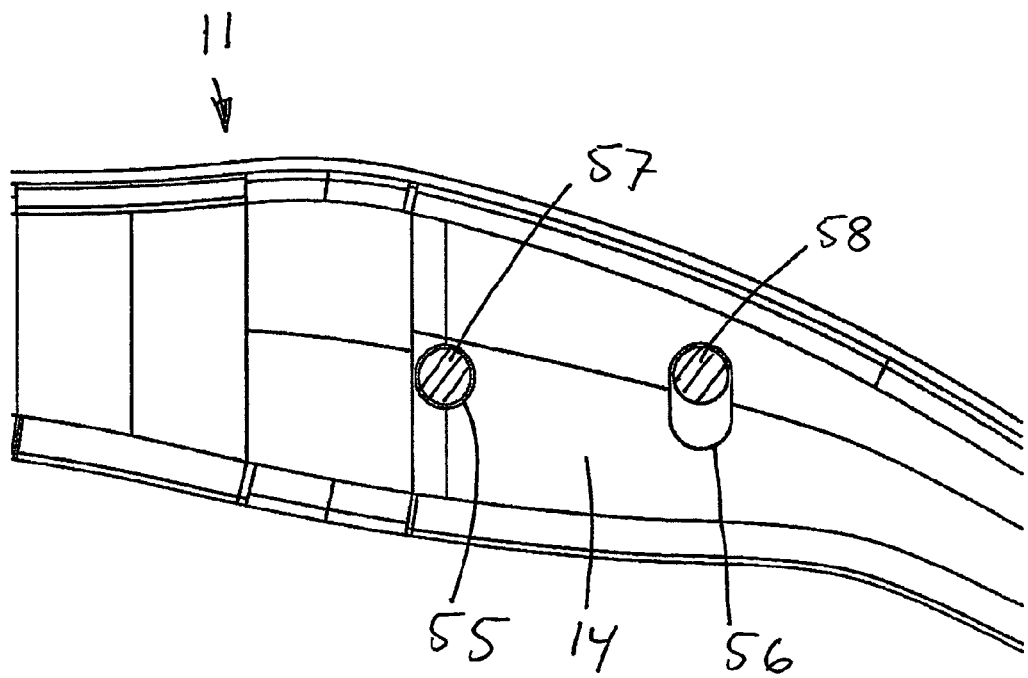

CRASH BOX AND A METHOD OF FASTENING A BUMPER BEAM

TECHNICHAL FIELD

This invention relates to crash box for fastening a bumper beam and to a method of fastening a bumper beam on a vehicle with intermediate crash boxes.

PRIOR ART

To fasten bumper beams in crash boxes is disclosed for example in U.S. Pat. No. 6,702,346 B2, EP-0763448 A1, DE-19537186 A1, DE-4127381 A1 and U.S. Pat. No. 3,998,485 A1. The crash boxes take up energy in the event of a crash by being plastically deformed axially.

OBJECT OF INVENTION AND BRIEF DESCRIPTION OF THE INVENTION

It is an object of the invention to provide a stable mounting of the bumper beam in the crash boxes. This object is met primarily by forming of metal sheet a left member and a right member for each crash box and jointing them with their top portions overlapping each other and their bottom portions overlapping each other, and adapting the sides of the crash box to abutment with the bumper beam such that the top portions and the bottom portions form tabs of double-sheet extending out over the upper and bottom surfaces of the bumper beam and fastening the tabs to the bumper beam. The invention is defined by the claims.

BRIEF DESCRIPTION OF THE DRAWINGS

FIG. 5 shows a detail of FIG. 4 seen vertically from above.

DESCRIPTION IN DETAIL OF THE SHOWN AND PREFERRED EXAMPLE OF THE INVENTION

Figure 1:
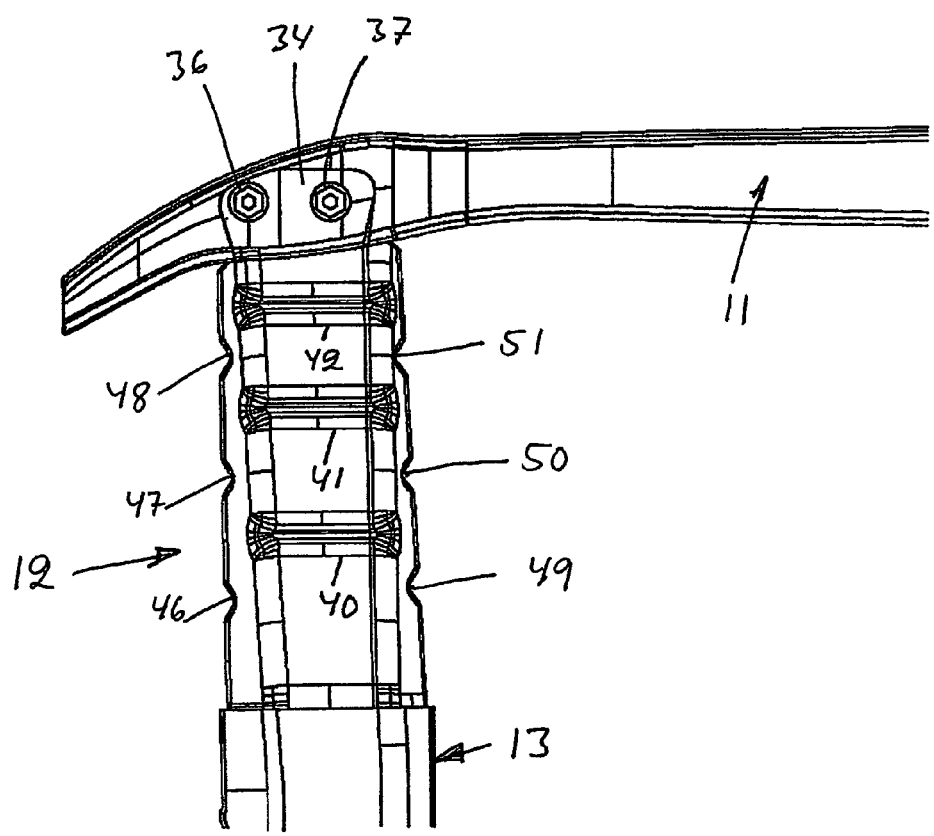
FIG. 1 is a view seen from above of one side of a bumper beam and its mounting with a crash box on a vehicle.
Figure 2:
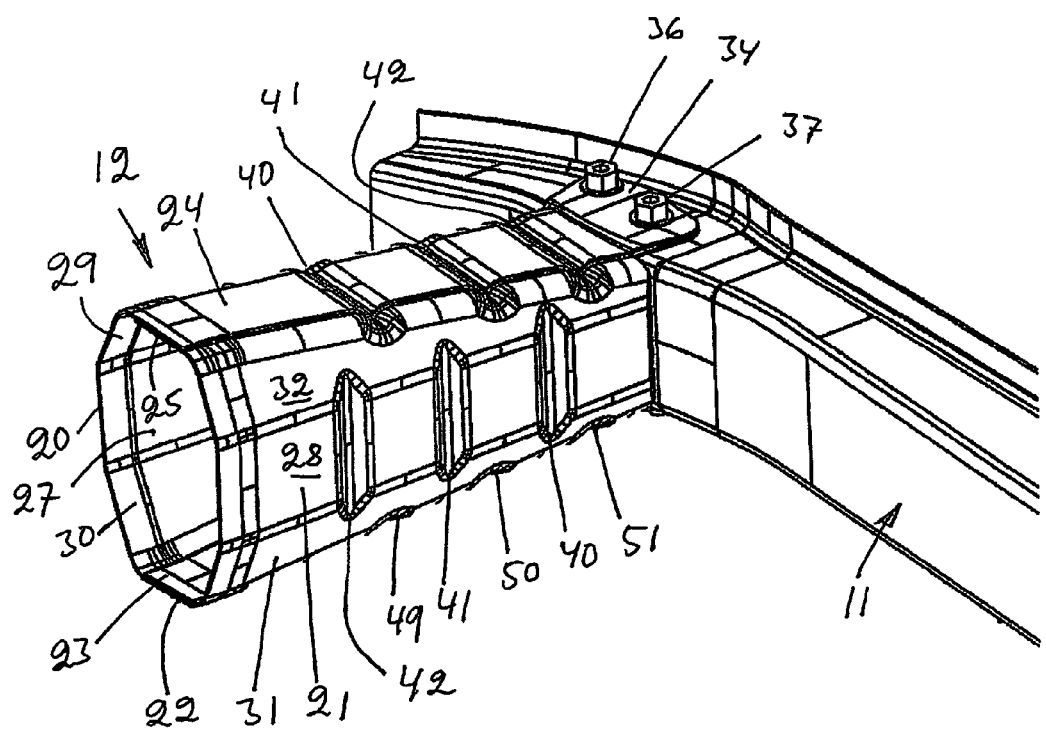
FIG. 2 is a perspective view corresponding to FIG. 1 but it shows the bumper beam and the crash box when they are not mounted on the vehicle.

FIG. 1 shows the left side of a front bumper beam 11 fastened in a crash box 12 that is carried by a supporting member of the vehicle, for example the side rail 13 of the vehicle.

Figure 4:
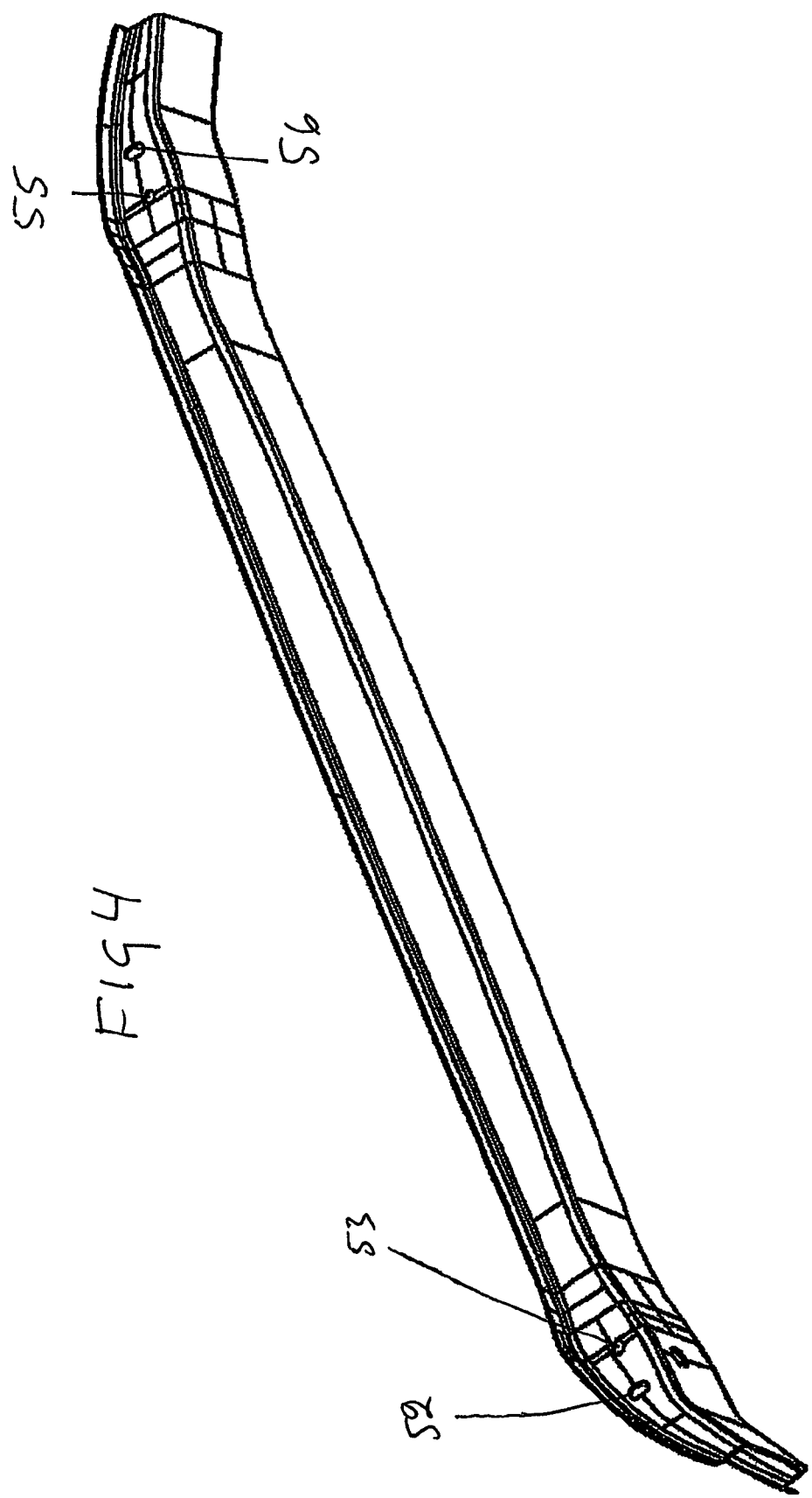
FIG. 4 is a perspective view of the entire bumper beam of the preceding figures.

The crash box has a form transversely that corresponds to the transverse form of the side rail and it is inserted in the side rail and welded to it. The crash box can alternatively be fastened in other ways. It may for instance have an end plate that is fastened to an end plate on the side rail by screws and nuts. The bumper beam is usually symmetrical as shown in FIG. 4 and symmetrically mounted in two similar crash boxes. The invention may also be applied on a rear bumper.

Figure 3:
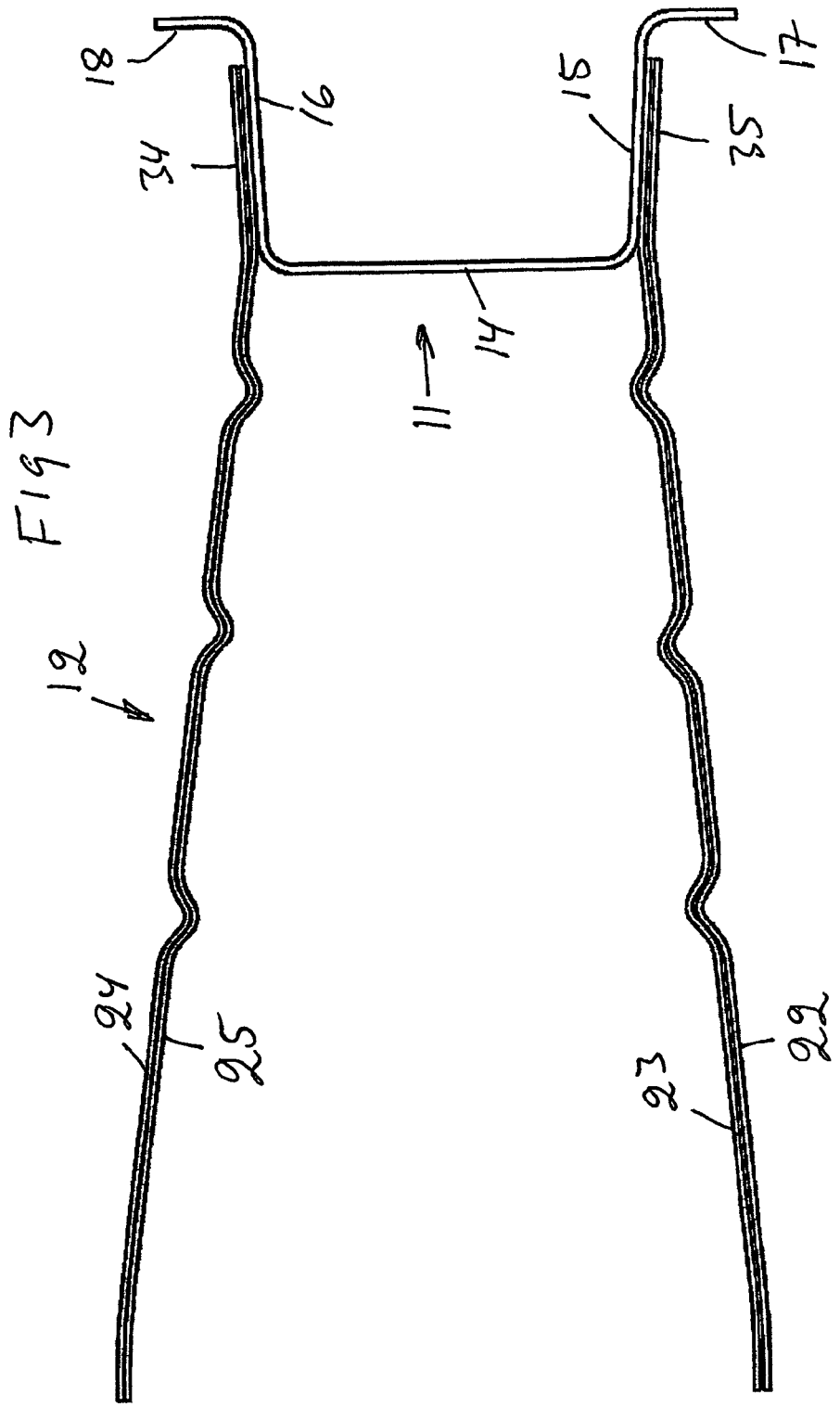
FIG. 3 is a section taken along line 3-3 in FIG. 1.

The bumper beam 11 is shown as an open hat beam (FIG. 3) with a central flange 14, two webs 15, 16 and side flanges 17, 18, and it has its central flange adjacent the vehicle and it opening facing outwards. The bumper beam may have another transverse section, and it can for instance have a cover that makes it a closed beam.

The crash box 12 comprises a left member 20 and a right member 21, which may suitably be formed of high-strength sheet steel, and these two members have their bottom parts 22, 23 overlapping one another and welded together so that the underside (the bottom) of the crash box will be double-sheeted. In the same way, the upper side (the top) of the crash box consists of two sheets 24, 25. The crash box is shown having eight planar sides between its corners. It has vertical or substantially vertical sides 27, 28 and inclined sides 29-32 between the vertical sides, and the top 24, 25 and bottom 22, 23 respectively. The crash box tapers between its big end, adapted to the side rail of the vehicle, and its small end adapted to the bumper beam.

The upper side 24, 25 of the crash box forms a tab 34 of double sheet that extends out over the upper side of the bumper beam, that is, out over the web 16, and the bottom side 22, 23 of the crash box forms a tab 35 that extends out over the underside of the bumper beam, that is, out over the web 15. These flaps 34, 35 of double sheet are fastened to the respective web 16, 15 by screws 36, 37 and nuts, and the crash box supports the bumper beam 11 in this way. The two sides 27, 29, 30 and 28, 31, 32 of single sheet are adapted to abut the bumper beam. The upper portions 24 and 25 of the left member and right member respectively need not be completely overlapping one another over their entire length but only near the beginning of the tab 34. The same goes for the corresponding bottom portions 22, 23.

The top 24, 25 of the crash box has transverse dents 40-42 and its bottom has corresponding dents 43-45. The vertical side portions 27, 28 have similar dents 46-48 and 49-51 respectively, and as seen along the crash box, these dents are positioned between the dents of the top and bottom. The dents 40-45 and 43-48 form triggers that initiate and control the deformation in the event of a crash. It is advantageous to the course of deformation that the crash box is octagonal with inclined surfaces that lack triggers, but the invention is not restricted to this form and the crash box may have another form and another type of triggers.

FIG. 4 shows the entire symmetrical bumper beam 11 and its two holes 52, 53 for the screws 36, 37 that have been described with reference to the preceding figures. Holes 55, 56 for the fastening of the other end of the bumper beam are also shown. FIG. 5 shows, at a larger scale, the screw holes 55 and 56 and screws 57, 58 in the holes 55, 56 at the right end of the bumper beam. The figure shows the screws but, for clarity, the crash box and its upper tab is not shown. The screw 57 fits the circular hole 55 whereas the hole 56 is oblong in the longitudinal direction of the vehicle and the screw 58 is in contact with the front wall of the hole. The oblong hole 56 is positioned adjacent the outer end of the bumper beam relative to the hole 55. There may be more than one oblong hole. The corresponding screw holes in the upper tab 34 of the crash box are circular and fit the screws 57, 58. The fastening of the bumper beam in the lower fastening tab is identical with the fastening in the upper one. Both screw holes 55, 56 in the bumper beam can alternatively fit the screws and the tab 34 can instead have one circular hole and one or more oblong holes.

The two crash boxes are comparatively long and in the event of an off-set crash against the left crash box 12, shown in FIG. 1, this crash box is compressed and the bumper beam will turn about the screw 55. The oblong hole 56 will permit this turning around the screw 55 without moving the screw 58. Thus, in an off-set crash against one of the crash boxes, the other crash box will be intact and not bend if the crash is not a large one.

The invention claimed is:

1. A crash box for supporting a bumper beam (11), characterized in that it comprises a left member (20) and a right member (21), which are jointed together and have top portions (24, 25) overlapping each other and bottom portions (22, 23) overlapping each other to form double-sheet tabs (34 and 35 respectively) adapted for contact with and for fastening of the bumper beam.

2. The crash box according to claim 1, characterized in that the tabs (34, 35) have mounting holes for fastening of the bumper beam with screws (36, 37).

3. The crash box according to claim 1, characterized in that the crash box is octagonal in its transverse section and has triggers (40-51) on every other side.

4. A method of fastening a bumper beam (11) to a vehicle by intermediate crash boxes (12) of formed sheet metal, characterized in forming a left member (20) and a right member (21) for each crash box and jointing them with their top portions (24, 25) overlapping each other and their bottom portions (22, 23) overlapping each other, adapting the sides of the crash box to abutment with the bumper beam such that the top portions and the bottom portions form tabs of double-sheet (24, 25 and 22, 23, respectively) extending out over the upper and bottom surfaces of the bumper beam and fastening the tabs to the bumper beam.

5. The method according to claim 4, characterized by fastening the bumper beam (11) to the tabs (24, 25; 22, 23) with screws.

6. The method according to claim 5, characterized by fastening the bumper beam (11) in each tab (34, 35) with more than one screw and having one screw hole (55) that fits one screw, whereas the other screw hole/holes (56) permit for the bumper beam to turn a limited amount around said one screw.

7. The crash box according to claim 2, characterized in that the crash box is octagonal in its transverse section and has triggers (40-51) on every other side.

* * * * *